INVENTORS
HOLLIS K. GLEASMAN
EDWIN ELLIOT HOOD
BY
William S. Thompson
ATTORNEY

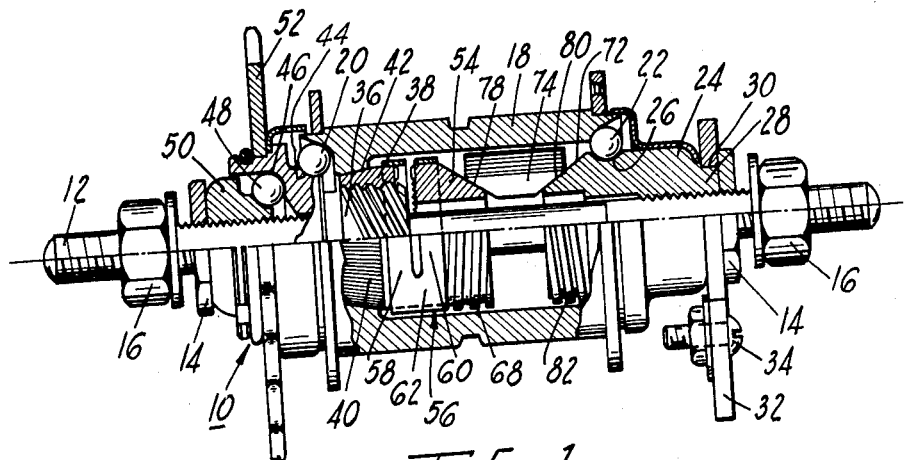
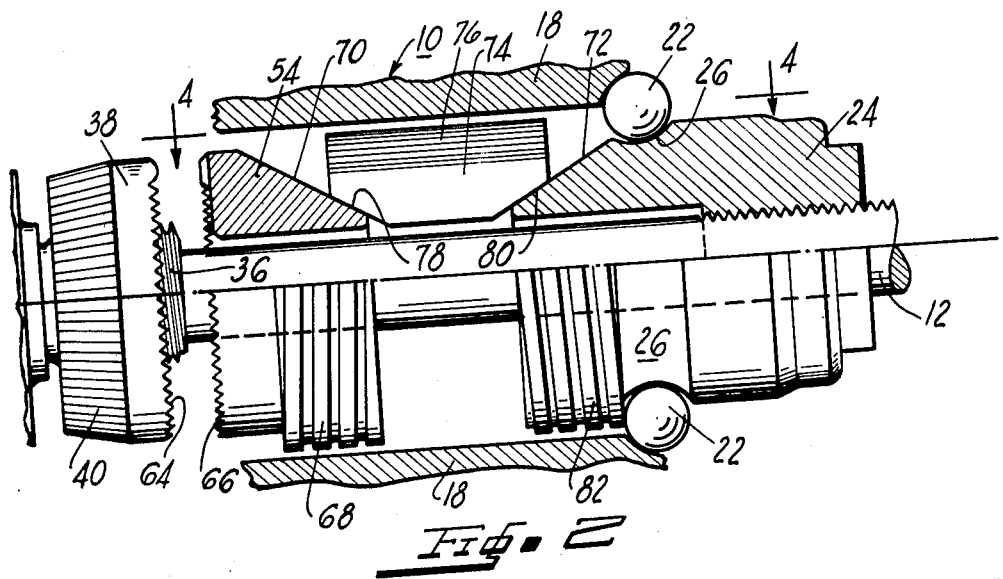

3,252,552
BICYCLE BRAKE
Hollis K. Gleasman and Edwin Elliot Hood, Elmira, N.Y.,
assignors to The Bendix Corporation, Elmira, N.Y., a
Corporation of Delaware
Filed Oct. 19, 1964, Ser. No. 404,796
8 Claims. (Cl. 192—6)

The present invention relates to a coaster type bicycle brake and more particularly to a coaster bicycle brake of the type adapted to be contained within the rear bicycle wheel hub and actuated by back pedalling which transmits motion through the drive chain to impart reverse rotation for braking action on a drive sprocket.

It is an object of the present invention to provide a bicycle brake of the type described which is low in cost, rugged and reliable.

It is a further object of the present invention to simplify or eliminate the normal brake shoe parts and adapt brake actuating members to supply the shoe function of one or both of the brake shoes.

It is a still further object of the present invention to provide a brake design having members which are translated generally axially to the hub for engagement action including means for deflecting the brake members radially into the hub for frictional engagement.

It is another object of the present invention to provide a brake design wherein the brake engaging surfaces are formed to assist or retard brake engaging action. Other objects and advantages of the present invention will become apparent from the accompanying description and drawings wherein:

FIGURE 1 is a side view of a first embodiment of a one-shoe brake in accordance with the teachings of our invention taken partly in section and partly broken away to illustrate various features of the internal brake structure;

FIGURE 2 is an enlarged view of a portion of the brake parts of the one-shoe brake of the FIGURE 1 embodiment to more clearly show the novel brake members;

Figure 4:
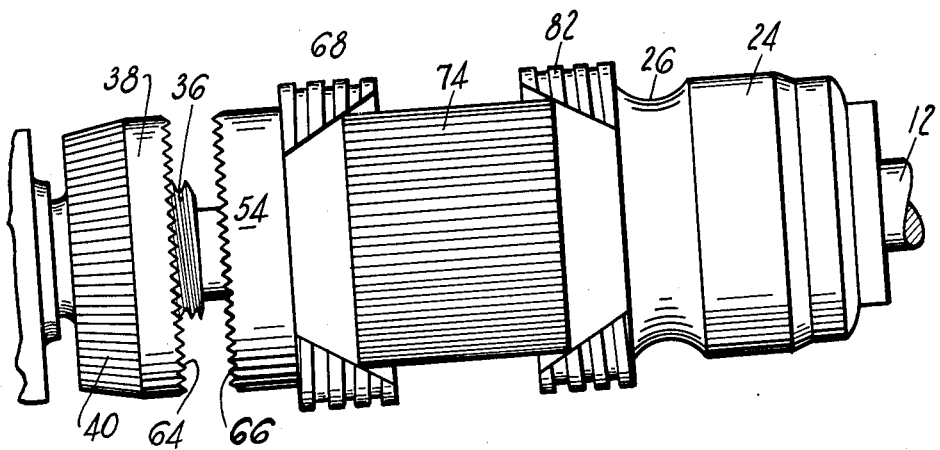
FIGURE 4 is still another view of the one-shoe embodiment which is taken along section line 4—4 of FIGURE 2.

Referring to FIGURES 1, 2 and 4 illustrating the first "one-shoe" embodiment of the present invention, the hub contained brake is generally designated by numeral 10. There is illustrated a stationary axle 12 adapted to be mounted in the rear fork of a bicycle. A pair of brake anchor nuts 14 are threaded on opposite ends of the axle. Axially outwardly of anchor nuts 14 are connecting nuts 16. Each pair of anchor and connecting nuts are adapted to secure the hub and brake assembly to one of the bicycle frame rear support forks (not shown).

A hub 18 is rotatably mounted on bearings 20 and 22, arranged at its opposed ends. An anchor end brake expander member 24 is disposed radially inwardly of bearing 22 and contains a peripheral groove 26 which forms the track for bearings 22. Anchor end expander has a square shaped projection 28 formed at its extreme right end which is fitted into a complementary shaped hole 30 formed in anchor arm 32. Anchor arm 32 is adapted to be non-rotatively secured to the bicycle frame by screw and nut connection 34 as is well known in the art. It will be observed that square projection 28 will also insure that anchor end expander 24 is firmly held against rotation.

A screw shaft 36 is rotatably mounted on the axle 12 and has a clutch nut 38 threaded thereon having a knurled conical clutch surface 40 adapted to engage the conforming surface 42 formed in the interior of hub 18. Screw shaft 36 has a first bearing groove 44 for retaining hub support bearing 20 and a second bearing groove 46 which receives bearing 48 which in turn is supported by bearing cone 50. A driving member or sprocket 52 is drivably connected to an external peripheral surface of screw shaft 36. Concentric with axle 12 and disposed axially adjacent clutch nut 38, there is arranged a drive end expander member 54. Drive end expander member is frictionally supported by spring retarder ring 56, illustrated in FIGURE 1 only, which is comprised of a pair of split rings 58 and 60 connected by bridge section 62. Split ring 58 grips clutch nut 38, whereas split ring 60 grips drive end expander 54. Clutch nut 38 and drive end expander 54 each have a series of annularly-arranged dentil teeth 64 and 66 respectively, see FIGURES 2 and 4. The main portion of drive end expander 54 is of generally-cylindrical shape with spiral or helical grooves 68 formed on its external surface closely spaced with the interior surface of hub. An inclined ramp segment 70 is formed on one side of the drive end expander (see FIGURE 4) and is aligned with a similar inclined ramp 72 formed on anchor end expander 24. The expanders are axially spaced from one another and the gap is bridged by brake shoe 74 having an arcuate external grooved surface 76 generally conforming in shape to the hub interior. Shoe 74 has conforming ramp segments 78 and 80 on its radially-inward surface mating with ramps 70 and 72 respectively of the expander members. Anchor end expander is also of generally-cylindrical shape and has spiral or helical grooves 82 formed on its surface.

*Operation*

In operation of our one-shoe brake, driving operation is first discussed. Anchor arm 32 maintains rotationally-fixed anchor end expander 24. Shoe 74 is supported on the ramps 70 and 72 and thus, acts as a key restraining drive end expander 54 against rotation. As split rings of retarder 56 frictionally grip both drive end expander and clutch nut 38, there will be a frictional force always tending to restrain the clutch nut from rotating. Thus, on forward pedalling of the sprocket 52, clutch nut 38 will be restrained from rotating with screw shaft 36 and will slip on the screw shaft threads moving axially to the left. Clutch nut 38 will continue to translate to the left until the knurled surface 40 engages the conforming hub surface 42 whereby drive engagement is established and hub 18 rotates with sprocket 52. During forward drive, either or both the split rings 58 and 60 will slip, permitting relative rotation between the clutch nut 38 and drive end expander 54.

If now braking is desired, the operator back-pedals the bike, reversing the rotation of sprocket 52 and screw shaft 36. Clutch nut 38, still under the restraint of retarder 56, will now translate axially to the right until it engages the drive end retarder 54 through dentil teeth 64 and 66. On further reverse rotation, the clutch nut will force the drive end expander to the right, moving the brake shoe up on the ramps 70 and 72 and into contact with the hub 18. As the brake shoe is brought into contact with the hub, the radial reaction force operates to deflect the drive and anchor end expanders downwardly and cause the helical surfaces 68 and 82 to come into braking contact with the opposed hub surface approximately 180° from the shoe contact point. It will be noted that drive end expander has ample clearance with respect to axle 12 and may be readily displaced, whereas anchor end expander is supported only at its right end on axle 12 so that the left end may operate as a cantilever beam and deflected under the applied forces. It should be understood that the clearance between drive and anchor end expanders and the hub is small and little deflection is required. In certain designs, it may be desired to closely mount both the expanders on the axle 12 and permit axle bending to provide the necessary displacement.

It is desirable to form the expander surfaces 68 and 82 to have a diameter as close as possible to the inside diameter of the hub 18. Relatively close spacing between expanders and hub will provide the following desirable advantages:

(1) It will hold to a minimum the lost motion required to actuate the brake.

(2) It will reduce the probability or degree of misalignment of drive end expander 54 from the axle centerline. It is desirable to hold this angular error at a minimum in order to provide the maximum support for the loose shoe 74.

(3) Since the expanders also act as brake shoes, it is desirable to have as much of the expanders contact the hub as possible during braking. This is facilitated by closer agreement between hub inside diameter and expander outside diameters.

Whereas it has been previously known that grooving formed on brake shoes could be used with advantage to wipe grease, etc. from the braking surfaces, in the present invention the addition of spiral or helical grooving, particularly to drive end expander 54, provides both this previously-known function and in addition, is utilized to assist or retard the braking effort as desired. During braking, as the expanders are brought into contact with the surface of hub 18, a number of asperities in this surface will project into the spiral grooves. As before complete stop is obtained, the hub will be rotating forwardly with respect to the expanders, this surface roughness will produce an axially-directed force component on the expanders acting in a direction depending on whether the spiral grooving is a right or left hand thread. In the FIGURE 1 embodiment, the thread or helical grooving on drive end expander is formed so that this axial force component will assist the expander in the braking direction and thus reduce the amount of brake applying effort required. For brake designs having a high mechanical advantage between applying effort and brake shoe force, the brake members may have a tendency to stick in the engage position. This tendency can be reduced by reversing the helical grooves so that the axial force component opposes the movement of the expanders in the braking direction. This latter arrangement is illustrated in the FIGURE 3 embodiment, but it will be understood that it could also be applied to the FIGURE 1 embodiment or vice-versa. Whether the spiral grooving should aid or retard the expander depends in large measure on the angle of ramps 70 and 72 selected.

Figure 3:
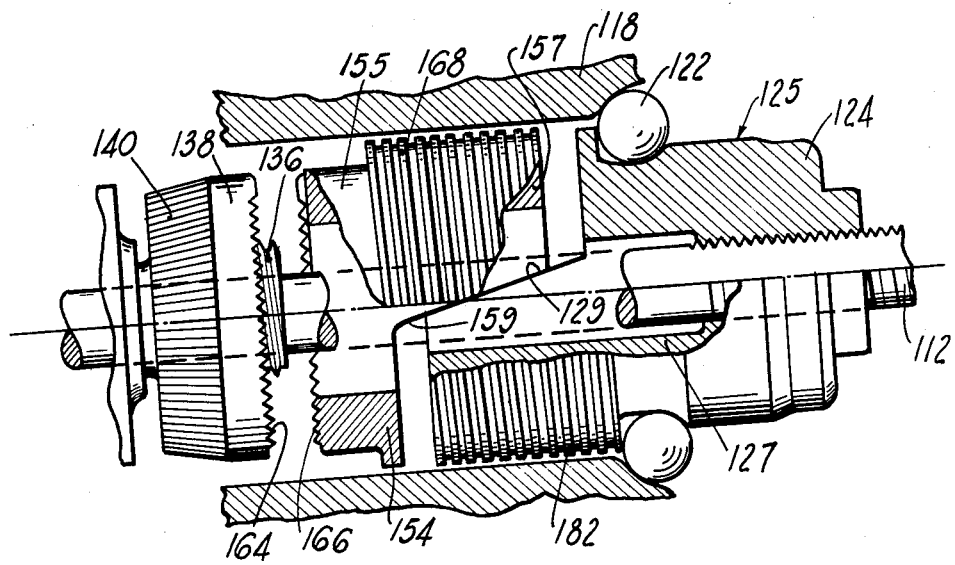
FIGURE 3 is a partial side view in section of a second "no shoe" embodiment of our invention.

In FIGURE 3 there is shown a "no-shoe" brake operating by deflection of expander members similar to the one-shoe embodiment of FIGURE 1. This brake is adapted for use with a similar hub and drive mechanism to that already described and therefore, has been only partly shown to more fully emphasize the dissimilar structure. Parts corresponding to those of the FIGURE 1 embodiment are identified by the use of a three digit number of the one hundred series wherein the last two digits correspond to those used to identify the corresponding part in FIGURE 1. Referring to FIGURE 3, the drive end expander member 154 is comprised of a generally-cylindrical portion 155 and a semi-cylindrical, axially-extending portion 157. Helical grooves 168 are formed on the surface of semi-cylindrical, axially-extending portion 157 covering an arc of approximately 180°. The helical grooves 168 are arranged of an opposite hand from that illustrated in FIGURE 1 to provide an axial force resisting movement of the drive end expander towards the braking position and thus minimize sticking of the brakes. Each arcuate end of portion 157 terminates at an inclined surface generally indicated by numeral 159 which is inclined a small angular amount from the axial centerline of the brake. The anchor end expander 124 has a first portion 125 of generally-cylindrical shape and a second semi-cylindrical, axially-extending portion 127 overlapping and abutting the axially-extending portion 157 of the drive end expander 154. Helical grooves 182 are formed on portion 127, covering an arc of approximately 180°. The arcuate ends of portion 127 terminate at an inclined surface 129 which is similar and complementary to inclined surface 159 of drive end expander 154. On brake actuation, clutch nut 138 translates to the right engaging drive end expander 154 which telescopes with the fixed anchor end expander 124. The inclined surfaces 129, 159 cause the semi-cylindrical portions of the expander members to deflect radially-outwardly into braking engagement. The flat inclined surfaces 129, 159 also key drive end expander 154 to anchor end expander 124 so that it is fixed against rotation. A retarder member (not shown) similar to the double splint ring member 58–62, shown in FIGURE 1, may be used to frictionally grip clutch nut 138.

Although certain specific embodiments have been illustrated and described to disclose certain preferred forms of our invention, it will be understood that changes may be made in the specific structure without departing from the scope and spirit of the invention as defined in the claims.

We claim:

1. In a coaster brake for bicycles and the like:
a fixed axle;
a rotatable hub member concentric with said axle;
a driving sprocket member;
clutch and actuating means operative to selectively interconnect and disconnect said sprocket member and said hub member in response to forward and reverse rotation respectively of said sprocket member;
an anchor end expander member concentric with and arranged intermediate said hub member and said fixed axle;
a drive end expander member concentric with and arranged intermediate said hub member and said fixed axle;
said drive end expander arranged axially between said clutch means and said anchor end expander;
each of said expander members having an inclined surface jointly operative to deflect said expander members radially outwardly into braking engagement with said hub on relative axial movement of said expander members towards one another; and
said clutch and actuating means operative to move axially on reverse rotation of said sprocket member and engage said drive end expander, moving said drive end expander axially towards said anchor end expander in a brake applying direction.

2. In a coaster brake for bicycles and the like:
a fixed axle;
a rotatable hub member concentric with said axle;
a driving sprocket member;
a screw shaft drivably connected to said sprocket member and arranged concentric with said axle intermediate said axle and said hub member;
a clutch and actuating member threadedly mounted on said screw shaft and axially movable with respect to said screw shaft in first and second opposed axial directions in response to the direction of rotation of said screw shaft;
said clutch and actuating member operative when moved in a first axial direction to drivably engage said hub member;
an anchor end expander member axially spaced from said clutch and actuating member;
a drive end expander member spaced axially intermediate said anchor end expander and said clutch and actuating member;
each of said expander members having an inclined surface jointly operative to deflect said expander members radially outwardly into braking engagement with said hub on relative axial movement of said expander members towards one another; and said clutch and actuating member operative when moved in a second axial direction to engage and move said drive end expander axially towards said anchor end expander in a brake applying direction.

3. In a coaster brake for bicycles and the like as claimed in claim 2, including retarder means operative to frictionally retard said clutch and actuating member against rotation with said screw shaft.

4. In a coaster brake for bicycles and the like:
a fixed axle;
a rotatable hub member concentric with said axle;
a driving sprocket member;
a screw shaft drivably connected to said sprocket member and arranged concentric with said axle intermediate said axle and said hub member;
a clutch and actuating member threadedly mounted on said screw shaft and axially movable with respect to said screw shaft in first and second opposed axial directions in response to the direction of rotation of said screw shaft;
said clutch and actuating member operative when moved in a first axial direction to drivably engage said hub member;
an anchor end expander member axially spaced from said clutch and actuating member;
a drive end expander member spaced axially intermediate said anchor end expander and said clutch and actuating member;
each of said expander members having a helically-grooved surface spaced closely adjacent said hub member;
each of said expander members having an inclined surface jointly operative to deflect said expander members radially outwardly urging their respective helically-grooved surfaces into braking engagement with said hub on relative axial movement of said expander members towards one another;
said helically-grooved surfaces operative on braking engagement with said hub to produce an axial force component acting on said expander members;
said clutch and actuating member operative when moved in a second axial direction to engage and move said drive end expander axially towards said anchor end expander in a brake applying direction.

5. In a coaster brake for bicycles and the like as claimed in claim 4 wherein the helically-grooved surface formed on said drive end expander produces an axial force component aiding said drive end expander to move towards the brake engaged position.

6. In a coaster brake for bicycles and the like as claimed in claim 4 wherein the helically-grooved surface formed on said drive end expander produces an axial force component resisting movement of said drive end expander towards the brake engaged position.

7. In a coaster brake for bicycles and the like:
a fixed axle;
a rotatable hub member concentric with said axle;
a driving sprocket member;
clutch and actuating means operative to selectively interconnect and disconnect said sprocket member and said hub member in response to forward and reverse rotation respectively of said sprocket member;
an anchor end expander member axially spaced from said clutch and actuating means;
a drive end expander member spaced axially intermediate said anchor end expander and said clutch and actuating member;
each of said expander members having an inclined surface;
said inclined surfaces being radially offset and axially aligned;
an arcuate brake shoe member arranged intermediate said hub member and said expander members and having at its radially-inner surface a pair of ramp surfaces abutting and conforming to said inclined surfaces of said expander members and operative to mutually key said expander members rotationally together;
anchor arm means connected to said anchor end expander to fixedly hold said anchor end expander;
said clutch and actuating means operative to move axially on reverse rotation of said sprocket member and engage and move said drive end expander axially towards said anchor end expander and operative to move said arcuate brake shoe radially outwardly up said inclined surfaces into braking engagement with said hub member; and
said arcuate brake on engagement with said hub operative to produce a radial reaction force deflecting said expander members radially into braking engagement with said hub member.

8. In a coaster brake for bicycles and the like:
a fixed axle;
a rotatable hub member concentric with said axle;
a driving sprocket member;
clutch and actuating means operative to selectively interconnect and disconnect said sprocket member and said hub member in response to forward and reverse rotation respectively of said sprocket member;
an anchor end expander member axially spaced from said clutch and actuating means;
a drive end expander member spaced axially intermediate said anchor end expander and said clutch and actuating member;
said expander members each having axially extending and mutually overlapping portions each having abutting complementary inclined surfaces;
said abutting inclined surfaces of said expander members operative to mutually key said expander members rotationally together;
anchor arm means connected to said anchor end expander to fixedly hold said anchor end expander;
said clutch and actuating means operative to move axially on reverse rotation of said sprocket member and engage and move said drive end expander axially towards said anchor end expander and operative through said abutting inclined surfaces to deflect said expander members radially outwardly into braking engagement with said hub member.

No references cited.

DAVID J. WILLIAMOWSKY, *Primary Examiner.*
ARTHUR T. McKEON, *Examiner.*